United States Patent [19]

Turney

[11] Patent Number: 5,678,169
[45] Date of Patent: Oct. 14, 1997

[54] RECEIVERS FOR DOWN-CONVERSION OF L1 AND L2 CARRIER FREQUENCY TRANSMISSIONS FROM ORBITING GLOBAL POSITIONING SYSTEM (GPS) SATELLITES

[75] Inventor: Paul F. Turney, Santa Clara, Calif.

[73] Assignee: Trimble Navigation Limited, Sunnyvale, Calif.

[21] Appl. No.: 497,443

[22] Filed: Jun. 30, 1995

[51] Int. Cl.$^6$ .................... H04B 17/00; H04B 7/185; G01S 5/02

[52] U.S. Cl. .................... 455/1; 455/136; 455/277.2; 455/278.1; 342/357

[58] Field of Search .................... 455/1, 232.1, 234.1, 455/234.2, 250.1, 254, 296, 303, 312, 132, 133, 134, 135, 136, 272, 277.1, 277.2, 278.1, 12.1, 313, 314; 342/46, 92, 385, 386, 392, 432, 437, 445, 444

[56] References Cited

U.S. PATENT DOCUMENTS 5,347,284  9/1994  Volpi et al. .................... 342/92

Primary Examiner—Nguyen Vo
Attorney, Agent, or Firm—Thomas E. Schatzel; Law Offices Of Thomas E. Schatzel A Prof. Corporation

[57] ABSTRACT

An improved navigation satellite receiver with a super heterodyne receiver channel configured to provide a first local oscillator frequency between L1 and L2 such that the down converted intermediate frequencies of L1 and L2 can be processed by the same intermediate frequency stages and a second mixer stage. A radio frequency (RF) selector switch is provided to select between inputting L1 and L2 to the first mixer. The RF switch is controlled by a digital signal processor (DSP) that also provides automatic gain control (AGC) to an intermediate frequency amplifier. Histories and expected levels of AGC for each of L1 and L2 are maintained by the DSP. The RF switch is briefly toggled over to select one of L1 or L2, while tracking a satellite on the other carrier frequency, just long enough to sample the AGC level needed. If the level is too high, given the histories and expectations for such levels, the sampled carrier frequency is assumed to be jammed, and a high risk for switching over. A switch to the sampled L1 or L2 carrier frequency is therefore prevented, which saves satellite tracking from being temporarily or permanently lost.

5 Claims, 2 Drawing Sheets

RECEIVERS FOR DOWN-CONVERSION OF L1 AND L2 CARRIER FREQUENCY TRANSMISSIONS FROM ORBITING GLOBAL POSITIONING SYSTEM (GPS) SATELLITES

BACKGROUND OF THE INVENTION

1. Field of the Invention

The invention relates generally to radio communication and more specifically to navigation receivers that operate with signals received from orbiting navigation satellites.

2. Description of the Prior Art

The global positioning system (GPS) supported by the United States government enables satellite navigation for military and civilian users alike. Two codes, a coarse-grained acquisition code (C/A-code) and a fine-grained precision code (P-code) are transmitted on two L-band microwave frequencies, e.g., L1 on 1575.42 MHz and L2 on 1227.6 MHz, and each provide ranging and GPS-system time information. The C/A-code is available to civilian users and the P-code is normally encrypted and available only to authorized users. Such encrypted P-code is referred to as Y-code. The C/A-code is a digital sequence that repeats each millisecond and is unique to one of two dozen satellites. The P-code is a digital sequence that has a period of 269 days. Each satellite is allocated a one-week long non-overlapping segment of the sequence, which it repeatedly transmits. A single week-long segment is $10.23 \times 10^6 \times 604800$ bits long, which comes from the P-code transmission rate of 10.23 MHz times the exact number of seconds in seven whole days. So a code phase uncertainty of even ±1 second can call for a search through 20,460,000 chips.

Not knowing the exact GPS system time is not an insurmountable problem in acquiring the code phase of the C/A-code, because a code generator in a GPS receiver can be slipped through all 1023 chips of the C/A-code in half-chip increments, and thereby discover the code phase in just a few seconds. Acquiring the P-code without knowing the precise GPS system time is practically impossible. An external source of precise time, for example, coordinated universal time (UTC), is usually not available. Because the GPS satellite system time must be known to within much less than one millisecond, the resulting code phase uncertainty is too great. A code-phase search can thus require searching through millions of chips for a match.

Therefore, authorized users tend to get to P-code code-phase acquisition by first acquiring the code phase and then the GPS system time available in the C/A-code. With knowledge of the GPS system time, the P-code code-phase uncertainty is reduced to just a few chips.

The long length of the P-code provides so much processing gain in the associated correlators that the P-code is relatively hard to jam. Spoofing of the encrypted P-code is practically impossible, because the code itself is secret. The C/A-code on the L1 carrier is easy to jam, and since the codes transmitted are well-known, spoofing of the satellite transmissions is easy.

In a hostile environment of deliberate spoofing or accidental jamming, it very often happens that only one of the L1 and L2 carrier frequencies will be handicapped. The orbiting satellites transmit L1 at higher power than L2, so all else being equal, the L1 signal to noise ratio (SNR) will be better than that for L2. However, the long precision-code sequence provides a tremendous correlator processing gain that can pull out a signal buried very deep in noise and interference. The secret nature of the encrypted P-code sequence also makes it impossible for an unauthorized user to spoof the legitimate transmission.

Many conventional dual-frequency receivers tend to flip back and forth between using L1 and L2, as dictated by the need to calibrate the ionospheric delays and to minimize interference. Such receivers can lose satellite tracking if the carrier they switch to is too buried in noise or interference. In some situations, such as switching from a partially-jammed L2 to completely jammed and unusable L1, the P-code code-phase can be lost and L1 cannot be acquired. If the receiver then tries to switch back to the partially-jammed L2, it may not be able to re-acquire the signals it had been tracking and navigation may be lost.

Dual frequency receivers have the ability to make ionospheric delay calculations from the fact that the propagation speeds of L1 and L2 differ with varying ionospheric conditions. Such differences are conventionally used to correct ranging information, in order to produce more accurate position fixes, e.g., during day light hours when the ionospheric delays are significant. It has therefore been the prior art practice to provide wholly separate L1 and L2 receiver channels so that simultaneous measurements of L1 and L2 may be taken. Since this solution is expensive, because of the duplication in receiver channels, other prior art receivers try to switch a receiver channel between down converting L1 and down converting L2. The measurements of L1 and L2 are therefore time-multiplexed. These prior art receivers are generally not able to collect information about the level of jamming on one downlink frequency while tracking another. So it was necessary to commit to a switchover to find out, and to accept the disruption to navigation this causes during the absence from the downlink it was tracking. Preferably, only the better, less-interfered-with carrier frequency is relied upon for navigation.

SUMMARY OF THE PRESENT INVENTION

It is therefore an object of the present invention to provide a navigation receiver for the simultaneous reception of both L1 and L2 carrier frequency transmissions from orbiting satellites.

It is a further object of the present invention to provide a navigation receiver that can sample either L1 or L2 frequency transmissions before committing the receiver channel in a switch-over to the other frequency.

It is another object of the present invention to provide a navigation receiver that is resistant to spoofing and jamming.

Briefly, an embodiment of the present invention comprises an improved navigation satellite receiver with a super heterodyne receiver channel configured to provide a first local oscillator frequency between L1 and L2 such that the down converted intermediate frequencies of L1 and L2 can be processed by the same intermediate frequency stages and a second mixer stage. A radio frequency (RF) selector switch is provided to select between inputting L1 and L2 to the first mixer. The RF switch is controlled by a digital signal processor (DSP) that also provides automatic gain control (AGC) to an intermediate frequency amplifier. Histories and expected levels of AGC for each of L1 and L2 are maintained by the DSP. The RF switch is briefly toggled over to select one of L1 or L2, while tracking satellites on the other carrier frequency, just long enough to sample the AGC level needed without disrupting tracking on the current carrier frequency. If the level is too high, given the histories and expectations for such levels, the sampled carrier frequency is assumed to be jammed, and a high risk for switching over. A prolonged switch to the sampled L1 or L2 carrier frequency is therefore prevented, which saves satellite tracking from being temporarily or permanently lost.

An advantage of the present invention is that a navigation receiver is provided for the simultaneous reception of both L1 and L2 carrier frequency transmissions from orbiting satellites.

Another advantage of the present invention is that a low-cost navigation satellite receiver is provided that does not lose satellite tracking lock in jamming environments by being able to sample a carrier frequency before committing an attempt to track a satellite on the sampled carrier frequency.

A further advantage of the present invention is that a low-cost dual-frequency navigation satellite receiver is provided that can measure ionospheric distortion by simultaneous measurements of the L1 and L2 carrier frequencies.

A still further advantage of the present invention is that a dual-frequency navigation satellite receiver is provided that is resistant to spoofing and jamming.

These and other objects and advantages of the present invention will no doubt become obvious to those of ordinary skill in the art after having read the following detailed description of the preferred embodiment which is illustrated in the drawing figures.

IN THE DRAWINGS

FIG. 1 is a schematic block diagram of a navigation satellite receiver in a first embodiment of the present invention that switches between L1 and L2 after first sampling AGC levels; and FIG. 2 is a schematic block diagram of a navigation satellite receiver in a second embodiment of the present invention that integrates the down conversion of L1 and L2 into a complex intermediate frequency signal for simultaneous measurements of L1 and L2.

DETAILED DESCRIPTION OF THE PREFERRED EMBODIMENT

Figure 1:
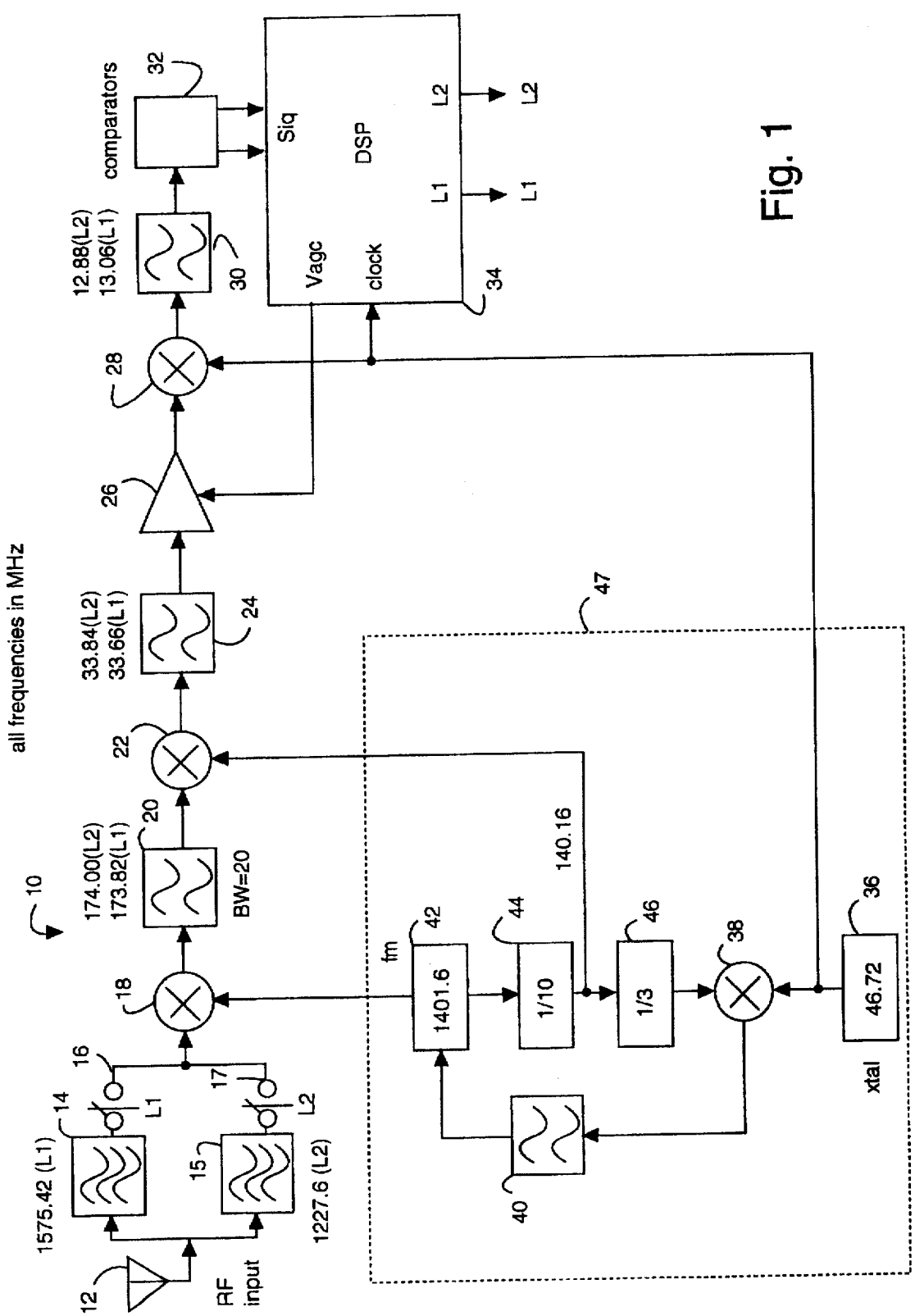

FIG. 1 illustrates a dual-frequency navigation satellite receiver embodiment of the present invention, referred to by the general reference numeral 10. The receiver 10 comprises a microwave patch antenna 12 for receiving L-band microwave radio transmissions from orbiting navigation satellites, such as are in orbit in the global positioning system (GPS) supported by the United States government. Two carriers are used for transmission, "L1" at 1575.42 MHz and "L2" at 1227.6 MHz. An L1 radio frequency (RF) filter 14 selectively passes and amplifies L1 signals received by the antenna 12. An L2 radio frequency (RF) filter 15 selectively passes and amplifies L2 signals received by the antenna 12. A RF selector switch 16 and another RF selector switch 17 respectively connect L1 and L2 to a first mixer 18. A first local oscillator input of 1401.6 MHz to the mixer 18 produces either a first intermediate frequency (IF) for L1 of 173.82 MHz or a first IF for L2 of 174.00 MHz, depending on which one of RF switches 16 and 17 is closed. A first IF bandpass stage 20 has a bandwidth of twenty MHz and amplifies the first IF for input to a second mixer 22. A second local oscillator frequency of 140.16 MHz is input to the second mixer 22 and produces a second IF of 33.66 MHz for L1 and a second IF of 33.84 MHz for L2. A second bandpass stage 24 passes the second IF for variable-gain amplification by an IF amplifier 26 that has its gain controlled by an automatic gain control (AGC) voltage ($V_{AGC}$). A third mixer 28 combines a third local oscillator frequency of 46.72 MHz to produce a third IF of 13.06 MHz for L1 and a third IF of 12.88 for L2. Amplification and filtering of the third IF is provided by a bandpass stage 30 which feeds a comparator stage 32 that samples and digitizes the signals at a one MHz rate. The samples are input to a digital signal processor (DSP) 34 that uses conventional techniques to derive position fixes from range information in the L1 and L2 carrier signals. The DSP 34 has two outputs that control the operation of the RF switches 16 and 17. An automatic gain control (AGC) voltage ($V_{agc}$) is output by the DSP 34 to set the gain of amplifier 26. A crystal controlled oscillator 36 provides the reference frequency of 46.72 MHz. A phase detector 38 provides a difference signal to a loop filter 40 for correcting a voltage-controlled oscillator (VCO) 42 that operates at 1401.6 MHz. A divide-by-ten unit 44 provides the second local oscillator frequency of 140.16 MHz. A divide-by-three unit 46 provides a 46.72 MHz signal that tracks the VCO 42 and that is compared to the 46.72 MHz reference frequency from oscillator 36. The combination of elements 36–46 constitutes a phase locked loop (PLL) 47.

The receiver 10 represents an improved dual-frequency receiver that is resistant to jamming in that the DSP 34 will establish a lock and track a satellite on either L1 or L2 and test the required AGC level to amplifier 26 before committing to a switch over to the other carrier frequency. The DSP 34 includes a computer-implemented process for keeping a history and an expected value of AGC levels for each of L1 and L2. When a switch over to the other of the carrier frequencies L1 or L2 would conventionally occur, the DSP 34 first samples for the presence of jamming on the other channel by briefly alternating RF switches 16 and 17, e.g., for five milliseconds. This is not long enough to lose lock on the satellites being tracked on the current carrier frequency, and not long enough to establish a lock on the other carrier frequency. But it is long enough to find the required AGC level and to assess its value. If the AGC level is gauged to be excessive, as is consequential in a jamming environment, any pending switch over between the two carrier frequencies is postponed.

Figure 2:
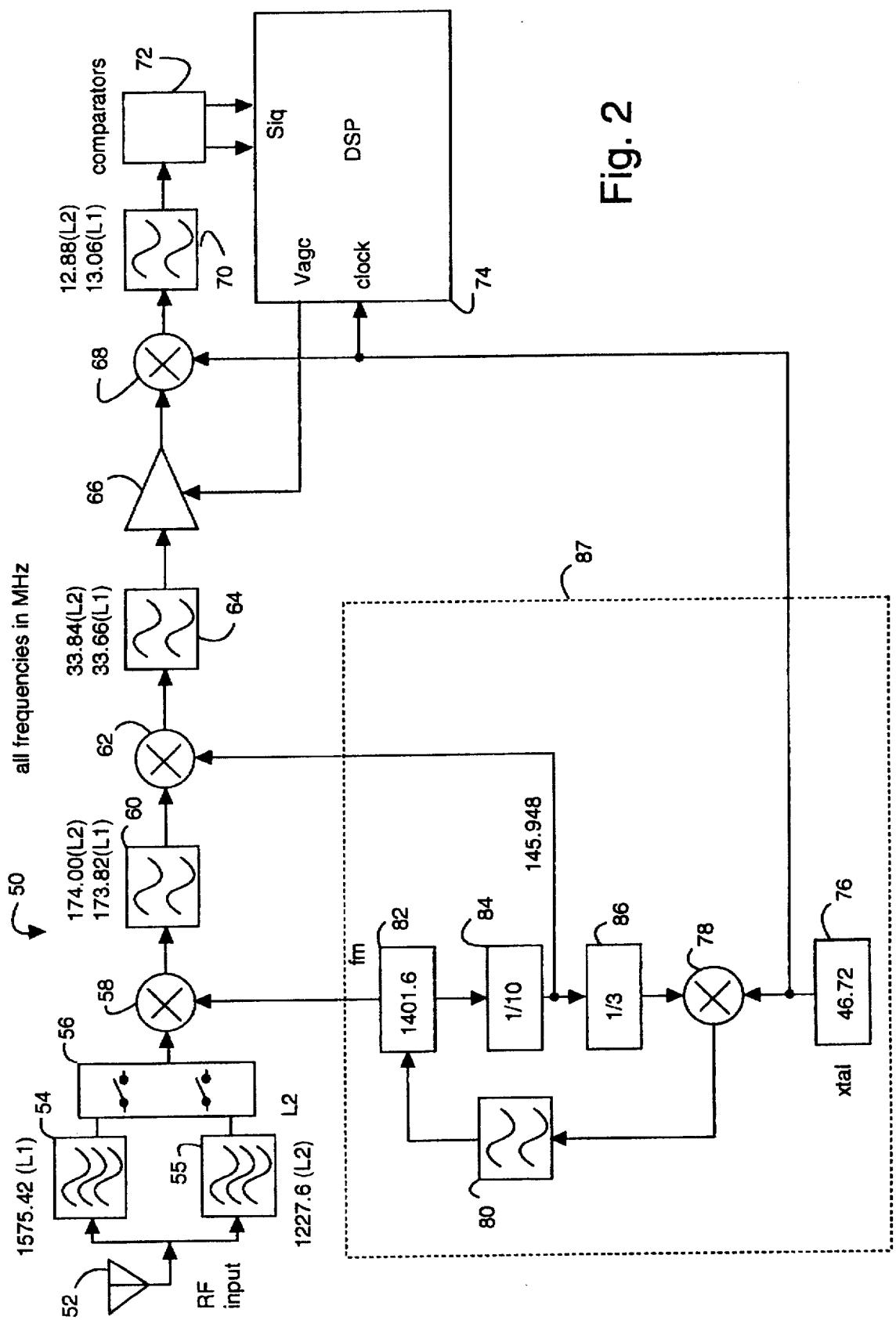

FIG. 2 illustrates a dual-frequency navigation satellite receiver embodiment of the present invention, referred to by the general reference numeral 50. The receiver 50 comprises a microwave patch antenna 52 for receiving L-band microwave radio transmissions from orbiting navigation satellites, such as are in orbit in the global positioning system (GPS) supported by the United States government. Two carriers are used for transmission, "L1" at 1575.42 MHz and "L2" at 1227.6 MHz. An L1 radio frequency (RF) filter 54 selectively passes and amplifies L1 signals received by the antenna 52. An L2 radio frequency (RF) filter 55 selectively passes and amplifies L2 signals received by the antenna 52. A RF switch stage 56 either or a combination of both of the signals L1 and L2 for presentation to a first mixer 58. A first local oscillator input of 1401.6 MHz to the mixer 58 simultaneously produces a first intermediate frequency (IF) for L1 of 173.82 MHz and a first IF for L2 of 174.00 MHz. A first IF bandpass stage 60 filters and amplifies both the first IFs for input to a second mixer 62. A second local oscillator frequency of 145.948 MHz is input to the second mixer 62 and produces a second IF of 33.66 MHz for L1 and a second IF of 33.84 MHz for L2. A second bandpass stage 64 passes the second IF for variable-gain amplification by an IF amplifier 66 that has its gain controlled by an automatic gain control (AGC) voltage ($V_{AGC}$). A third mixer 68 combines a third local oscillator frequency of 46.72 MHz to produce a third IF of 13.06 MHz for L1 and a third IF of 12.88 for L2. Amplification and filtering of the third IF is provided by a bandpass stage 70 which feeds a comparator stage 72 that samples and digitizes the signals. Since the two final IF frequencies of L1 and L2 are so different and do not overlap, even when skewed by Doppler shifting, the two signals are easily discriminated by conventional techniques. The samples are input to a digital signal processor 74 that uses conventional techniques to simultaneously derive satellite range and range-rate information in both the L1 and L2 carrier signals. An AGC control voltage is output by the DSP to set the gain of amplifier 66. A crystal controlled oscillator 76 provides a reference frequency of 46.72 MHz. A phase detector 78 provides a difference signal to a loop filter 80 for correcting a voltage-controlled oscillator (VCO) 82 that operates at 1401.6 MHz. A divide-by-ten unit 84 provides the second local oscillator frequency of 145.948 MHz. A divide-by-three unit 86 provides a 46.72 MHz signal that tracks the VCO 82 and that is compared to the 46.72 MHz reference frequency from oscillator 76. The combination of elements 76–86 constitutes a phase locked loop (PLL) 87. A computer-implemented process in the DSP 74 selects whether to use L1 only, L2 only or a combination of L1 and L2 carrier frequencies on the basis of the received signal level and jamming, and also to make ionospheric delay measurements.

The receiver 50 represents an improved dual-frequency receiver that uses one analog receiver channel to support multiple digital satellite tracking channels to track satellites by both L1 or L2. The DSP 74 includes a computer-implemented process for sorting between the C/A-code and P-code respectively included in the L1 and L2 carrier frequency signals.

FIG. 2 and the related discussion recite various local oscillator and intermediate frequencies for use with L1 and L2. The values resulted from an arbitrary selection of a first local oscillator frequency of slightly greater than one half of the frequency difference between L1 and L2 added to L2, so that the resulting intermediate frequencies of L1 and L2 would not overlap one another and make it hard for the DSP 74 to sort between them. Other frequency plans are possible, and some others may be more desirable, such as for manufacturing economic reasons.

Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An improved dual-frequency navigation satellite receiver with radio frequency (RF) selection for passing through one of two L-band microwave radio transmissions from orbiting navigation satellites to a downconverter with an automatic gain control (AGC) amplifier controlled by a digital signal processor (DSP), the improvement comprising:

RF selection means for sampling a required AGC level for receiving a first of said two L-band microwave radio transmissions while locked onto a satellite signal in a second of said two L-band microwave radio transmissions; and switch over prevention means connected to the RF selection means for postponing a switch over between said two L-band microwave radio transmissions when said sampling indicates by its excessively high level that said second L-band microwave radio transmission is accompanied by a jamming signal.

2. The improved receiver of claim 1, wherein:

the RF selection means comprises two RF switches connected to respective RF filters and amplifiers wherein the state of the switches in controlled by said DSP.

3. The improved receiver of claim 1, wherein:

the switch over prevention means comprises history and expected value means for comparing said AGC level to a current sample.

4. The improved receiver of claim 1, wherein:

the RF selection means comprises timing means for limiting the duration of a sample to a period not long enough to lose satellite lock on said second L-band transmission.

5. The improved receiver of claim 4, wherein:

the RF selection means comprises timing means for limiting the duration of a sample to five milliseconds.

* * * * *